United States Patent [19]

Michalski

[11] 3,954,625

[45] May 4, 1976

[54] FILTER AND METHOD OF FORMING SAME

[75] Inventor: David E. Michalski, Elk Grove Village, Ill.

[73] Assignee: Plastisonics Company, Inc., Chicago, Ill.

[22] Filed: Sept. 27, 1974

[21] Appl. No.: 509,958

[52] U.S. Cl. ............................. 210/445; 210/446; 210/451
[51] Int. Cl.² ............................................ B01D 35/00
[58] Field of Search ............ 210/445, 446, 451, 453

[56] References Cited
UNITED STATES PATENTS

| | | | |
|---|---|---|---|
| 3,471,019 | 10/1969 | Trasen et al. | 210/445 X |
| 3,719,595 | 3/1973 | Johnson | 210/445 |
| 3,722,697 | 3/1973 | Burke et al. | 210/451 |
| 3,782,083 | 1/1974 | Rosenberg | 210/445 X |

*Primary Examiner*—Charles N. Hart
*Assistant Examiner*—Richard W. Burks
*Attorney, Agent, or Firm*—Diller, Brown, Ramik & Wight

[57] ABSTRACT

This disclosure relates to a filter which includes a plastic housing and which has an intermediate filter screen. The peripheral portion of the screen is sealed between the two housing halves by flowing a portion of at least one of the housing halves through the screen and bonding that portion to the other housing half. Further, the housing has peripheral walls which are bonded to one another after partial assembly through an interference fit and a concentrated heating of the material of the housing halves.

7 Claims, 4 Drawing Figures

FILTER AND METHOD OF FORMING SAME

This invention relates in general to new and useful improvements in filters, and more particularly to a filter of the type which includes two plastic housing parts having incorporated therein and therebetween a filter screen.

Filters of the type to which this invention relates are well known. The filter screen or element is normally a screen disc of fine mesh cloth fabric, wire cloth or plastic. The filter must remove fine particles from a liquid as it passes through and to do this effectively, all liquid must pass through the screen. Inefficient filtering is normally due to liquid passing around the edge of the screen rather than through it. Also, at high filtration rates, segments of the circumferential edge of the screen can pull away from or free itself from its fastened position permitting liquid to pass through unfiltered.

In view of the foregoing, it is the primary object of this invention to provide a filter of the broad type wherein the filter element is securely bonded to the housing parts entirely about the periphery thereof so that there can be no liquid leakage at any time.

In accordance with this invention, the filter housing is of a simple two part construction with the filter screen sandwiched therebetween. No other fastening component and/or adhesive material is needed. The construction of the filter is such that when all three pieces are assembled, they are fused into a single unit with portions of the housing halves extending through the peripheral part of the filter screen and being bonded together, that portion of the filter housing which passes through the filter screen being circumferentially continuous.

In accordance with this invention, the housing halves include peripheral portions which are disposed in overlapping relation and between which are defined opposed support surfaces. One of these support surfaces is provided with a generally triangular cross sectional projection which, when the housing halves are brought together, is heated and flows through the peripheral portion of the filter element and into bonding contact with the other of the housing halves. In this manner, complete sealing of the filter element relative to the housing is assured with the seal being of such mechanical strength so as to prevent inward distortion of the filter element relative to the housing.

The overlapping portions of the housing include two parts, one of the parts being such as to permit a free telescoping of the housing portions relative to one another to permit the initial assembly of the housing halves, and the other parts providing an interference fit with these other parts, when heated, providing for material flow which assures a complete bond between the telescoping and overlapping housing portions.

With the above and other objects in view that will hereinafter appear, the nature of the invention will be more clearly understood by reference to the following detailed description, the appended claims and the several views illustrated in the accompanying drawings.

Figure 1:
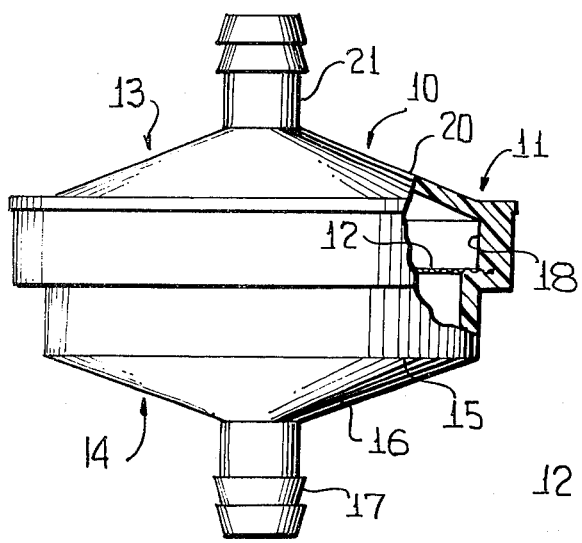
FIG. 1 is an elevational view of the filter with portions broken away and shows the mounting of the filter element therein.

Referring now to the drawings in detail, it will be seen that there is illustrated in FIG. 1 a filter which is formed in accordance with this invention, the filter including a housing, which is generally identified by the numeral 11 and an interior filter element 12. The housing 11 is of a two part construction and includes similar, but different, parts 13 and 14.

The housing half or part 14 includes a cylindrical body 15 which terminates in a downwardly tapering conical end 16 having projecting therefrom a tubular fitting 17 through which a fluid may flow. In a like manner, the housing part or half 13 includes a cylindrical body 18 to which there is integrally connected a conical end wall 20 which terminates in a fitting 21 through which a fluid may flow.

It is to be understood that flow through said filter is into one of the fittings 17,21, into the interior of the filter housing 11, through the filter element 12 and out through the other of the fittings 17,21.

Figure 2:
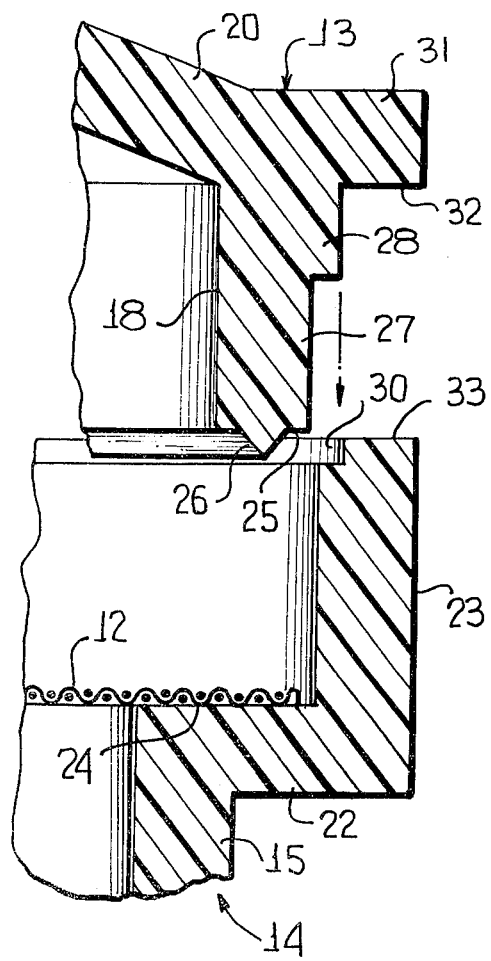
FIG. 2 is an enlarged fragmentary sectional view showing the broken away portions of the filter in FIG. 1 in an initial stage of assembly.

Referring now more specifically to FIG. 2, it will be seen that the housing half 14 has formed as an axial extension of the cylindrical body 15 an L-shaped cross sectional portion which includes an annular part 22 and a cylindrical part 23. The net result is that the end of the cylindrical body 15 and one surface of the annular part 22 combine to define a support surface 24 which is of an annular outline and on which the filter element 12 is initially seated, as is clearly shown in FIG. 2.

It is to be noted that the cylindrical body portion 18 of the housing half 13 has a free end which is also in the form of a support surface 25 which opposes the support surface 24. Further, the support surface 25 has a generally triangular cross sectional, annular projection 26.

Figure 3:
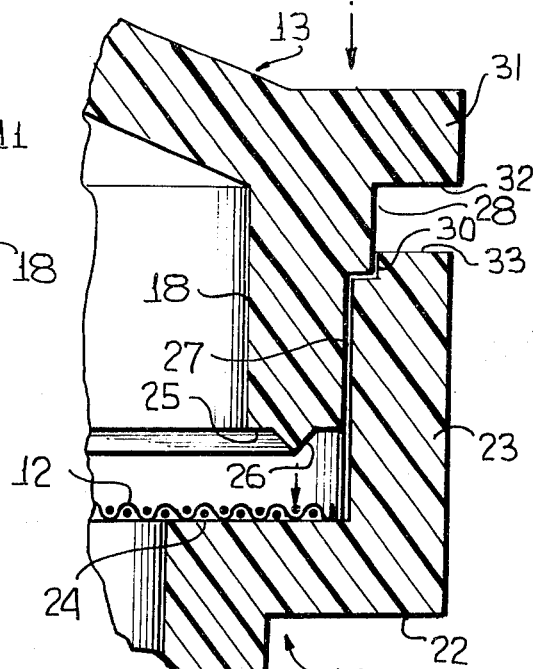
FIG. 3 is a fragmentary sectional view similar to FIG. 2 and shows a further stage of the assembly of the filter components with the filter components ready to be heated by means of sonic means.

It is also to be noted that the exterior surface of the cylindrical body portion 18 is of a stepped configuration so as to include a first part 27 of a lesser external diameter than a second part 28, and the first part 27 being spaced the furtherest from the conical end wall 20. The external surface of the part 27 is of a diameter less than the internal diameter of the cylindrical part 23 so as to freely telescope therein, as is clearly shown in FIG. 3. On the other hand, the external diameter of the part 28 is greater than the internal diameter of the cylindrical part 23 so as to provide for an interference fit, as is also shown in FIG. 3. Further, it is to be noted that the inner free corner of the cylindrical part 23 is cut away so as to define a notch or seat 30 in which the part 28 may initially seat, as is shown in FIG. 3, to assure proper alignment of the housing halves 13 and 14 prior to the bonding together of the housing halves in a manner to be described hereinafter.

Finally, the housing half 13 is provided with an annular radially outwardly directed projection 31 which includes a seating surface 23 which opposes a seating surface 33 formed on the free end of the annular part 23.

Figure 4:
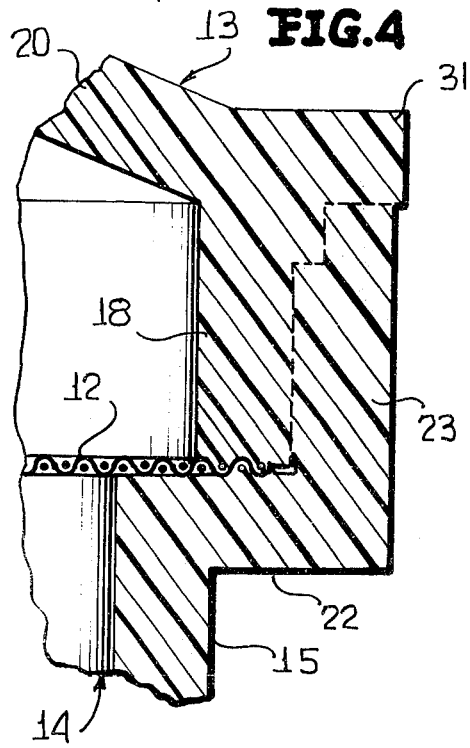
FIG. 4 is another enlarged fragmentary sectional view similar to FIG. 2 and shows the specific details of the welded together filter components.

With particular reference to FIGS. 3 and 4, it is first pointed out that the housing halves 13 and 14 are formed of a suitable plastic material which may be self-bonding under conditions of temperature and pressure. The telescoping parts of the housing halves 13 and 14 are suitably heated to a bonding temperature, preferably by means of a conventional sonic welder, and the housing halves 13,14 are urged together in telescoping relation. Because of the interference fit between the outer surface of the part 28 and the inner surface of the part 23, it will be seen that there will be flow of surface portions of the cylindrical body 18 and the cylindrical part 23 as the housing halves 13 and 14 move into greater telescoping relation. The flowing plastic material flows down between the opposed surfaces of the parts 27 and 23 to form a solid bond between the outer surface of the cylindrical body 18 and the cylindrical part 23, as is shown in FIG. 4.

As the support surface 25 approaches the filter element 12, the projection 26 engages the peripheral portion of the filter element 12 and flows through the meshes thereof into bonding contact with the support surface 24. Thus, the desired seal between the filter element 12 and the filter housing 11 is effected. At the same time, there is a positive mechanical interlocking of the peripheral portion of the filter element 12 with the filter housing 11 assuring against displacement of the filter element 12 relative to the filter housing 11 under heavy flow conditions.

The telescoping of the portions of the housing halves 13 and 14 continue until the surfaces 32,33 come into engagement and further bonding may occur between those surfaces as shown in FIG. 4. At this time the support surface 25 has passed partially into the meshes of the screen of the filter element 12 and is substantially in engagement with the support surface 24 although it is not necessary that there be positive contact between the surfaces 24 and 25 other than that which has occured through the radial flowing of the projection 26.

From the foregoing, it will be readily apparent that first of all a leak-proof and very strong mechanical bond is formed between the housing halves 13,14 so that the housing is of a leak-proof construction. Secondly, it will be seen that the peripheral part of the filter element 12 is in liquid-tight sealed relation with respect to the housing 11. Finally, there is a mechanical bond between the periphery of the filter element 12 and the housing 11 of such a nature wherein the filter element 12 will not be displaced by heavy flow of fluid through the filter 10. Notwithstanding these advantageous features of the filter 10, it is to be noted that the components thereof are of a simple configuration which may be readily molded on a mass production basis and that the assembly of the components of the filter is extremely simple and of a nature wherein the assembly may be on a mass production basis.

Although only a preferred embodiment of the filter construction has been specifically illustrated and described herein, it is to be understood that minor variations may be made in the details of the filter housing halves without departing from the spirit and scope of this invention, as defined by the appended claims.

I claim:

1. A filter assembly comprising a two piece housing assembly and a planar intermediate filter screen within said housing assembly, said housing assembly including a first housing part having a first peripheral wall terminating in a first continuous support surface, a second housing part having a second peripheral wall forming generally a continuation of said first peripheral wall and terminating in a second continuous support surface opposing said first support surface, said filter screen having a continuous peripheral portion disposed between said support surfaces, and a peripherally continuous portion of one of said support surfaces extending through said filter screen peripheral portion and forming a continuous heat bonded seal with the other of said support surfaces, said first peripheral wall having integrally connected thereto a third peripheral wall telescoped over said second peripheral walls outwardly of said filter screen, and there being a continuous bond between an outer surface of said second peripheral wall and an inner surface of said third peripheral wall.

2. The filter assembly of claim 1 wherein said housing parts are formed of a heat bondable plastics material and said filter screen is formed of a metallic material.

3. The filter assembly of claim 1 wherein said second peripheral wall outer surface initially has a major portion thereof in an axial direction spaced radially inwardly from said third peripheral wall portion, and a minor portion thereof in axial direction of a larger dimension than said third peripheral wall inner surface and in partial radial overlapping relation to said third peripheral wall.

4. The filter assembly of claim 3 wherein said third peripheral wall is notched to partially receive an end part of said second peripheral wall minor portion.

5. The filter assembly of claim 1 wherein said second peripheral wall and said third peripheral wall have axially opposed further surfaces.

6. The filter assembly of claim 1 wherein one of said support surfaces initially includes a projecting tapered portion which flows through said filter screen.

7. The filter assembly of claim 1 wherein said first peripheral wall extends inwardly of said second peripheral wall and forms a continuous seat for said filter screen inwardly of said seal.

* * * * *